(12) United States Patent
Yi et al.

(10) Patent No.: US 12,250,478 B2
(45) Date of Patent: Mar. 11, 2025

(54) SPAD SENSOR FOR NIGHT VISION APPLICATIONS

(71) Applicant: Fairchild Imaging, Inc., San Jose, CA (US)

(72) Inventors: Xianmin Yi, Menlo Park, CA (US); Chien-Horn Lu, San Jose, CA (US); Shanli Hu, Saratoga, CA (US); Edmond Tam, Fremont, CA (US); Angel Rogelio Lopez, Newark, CA (US); William Tian, Fremont, CA (US)

(73) Assignee: FAIRCHILD IMAGING, INC., Wilmington, DE (US)

( * ) Notice: Subject to any disclaimer, the term of this patent is extended or adjusted under 35 U.S.C. 154(b) by 7 days.

(21) Appl. No.: 18/056,093

(22) Filed: Nov. 16, 2022

(65) Prior Publication Data
US 2024/0163576 A1    May 16, 2024

(51) Int. Cl.
| H04N 25/57 | (2023.01) |
| G01J 1/44 | (2006.01) |
| H04N 25/617 | (2023.01) |
| H04N 25/77 | (2023.01) |

(52) U.S. Cl.
CPC ............... *H04N 25/57* (2023.01); *G01J 1/44* (2013.01); *H04N 25/617* (2023.01); *H04N 25/77* (2023.01); *G01J 2001/4466* (2013.01)

(58) Field of Classification Search
CPC ...... H04N 25/57; H04N 25/617; H04N 25/77; G01J 1/44; G01J 2001/4466
USPC ......................................................... 348/162
See application file for complete search history.

(56) References Cited

U.S. PATENT DOCUMENTS

| 11,170,549 | B2 * | 11/2021 | Gupta | G06T 7/30 |
| 2020/0036918 | A1 * | 1/2020 | Ingle | H01L 27/14625 |
| 2021/0109199 | A1 * | 4/2021 | Hennecke | G01S 17/10 |
| 2022/0018941 | A1 * | 1/2022 | Druml | G01S 17/08 |
| 2022/0272286 | A1 | 8/2022 | Price et al. | |
| 2022/0382056 | A1 * | 12/2022 | Price | H04N 23/651 |

OTHER PUBLICATIONS

International Search Report, PCT/US23/79172, mailed May 13, 2024, 8 pages.

* cited by examiner

*Primary Examiner* — Tung T Vo
(74) *Attorney, Agent, or Firm* — Panitch Schwarze Belisario & Nadel LLP

(57) ABSTRACT

Techniques to provide a low-power single-photon avalanche diode (SPAD) image. An example imaging device includes a SPAD array having a plurality of pixels configured to detect electromagnetic radiation, and a processing device configured to deactivate, based on an event count, a pixel of the SPAD array for a remaining duration of a first detection frame of the SPAD array. The pixel can remain deactivated for the remaining duration, and the remaining duration can span from a deactivation time until an end of the first SPAD frame. The processing device can be further configured to reactivate the pixel in a subsequent detection frame of the SPAD array.

15 Claims, 7 Drawing Sheets

SPAD SENSOR FOR NIGHT VISION APPLICATIONS

BACKGROUND

Night vision generally refers to the ability to see in relatively low-light conditions, and can be achieved to some extent naturally by way of scotopic vision, and to a higher extent by way of night-vision technology. Night vision requires both sufficient spectral range and sufficient intensity range. A standard night vision sensor is based on a complementary metal oxide semiconductor (CMOS) image sensor (CIS) design. Unfortunately, the power consumption of such designs is relatively high (e.g., 500 milliwatts, or more). To this end, non-trivial issues with night vision remain.

SUMMARY

In an example, a method of providing a single-photon avalanche diode (SPAD) image is provided. The method can comprise deactivating, based on an event count, a pixel of a SPAD array for a remaining duration of a first SPAD frame, wherein the pixel remains deactivated for the remaining duration and the remaining duration spans from a deactivation time until an end of the first SPAD frame. The method can further comprise reactivating the pixel in a subsequent SPAD frame. In some cases, the event count comprises an event count for the pixel, and deactivating the pixel is in response to the event count for the pixel reaching or exceeding a threshold count. In some cases, the event count for the pixel comprises an event count for the pixel during the first SPAD frame. In some cases, the threshold count is based on a square of a predetermined signal-to-noise ratio. In some cases, the event count for the pixel corresponds to a number of avalanche events counted by a counter. In some cases, the event count comprises an event count for the pixel, and the method further comprises estimating an intensity for the pixel for the first SPAD frame based on a count rate for the pixel, the count rate based on the event count for the pixel and a time measure corresponding to the event count. In some cases, the count rate for the pixel comprises the event count for the pixel divided by the time measure corresponding to the event count. The estimated intensity for the pixel can comprise a product of the count rate and a full duration of the first SPAD frame. In some cases, the event count for the pixel comprises a number of events measured during the first SPAD frame. The first SPAD frame can be divided into a plurality of time windows. The time measure for the event count can comprise a number of the time windows for the event count. The full duration of the first SPAD frame can comprise a total number of the plurality of time windows of the first SPAD frame. In some cases, the estimated intensity for the pixel for the first SPAD frame corresponds to a dynamic range of the pixel for the first SPAD frame. In some cases, the method further comprises deactivating a plurality of pixels of the SPAD array for respective remaining durations of the first SPAD frame. Reactivating the pixel in the subsequent SPAD frame can include reactivating the plurality of pixels at a start of the subsequent SPAD frame. In some cases, the SPAD image comprises a 2-dimensional (2D) night vision image.

In another example, an imaging device is provided. The imaging device can comprise a single-photon avalanche diode (SPAD) array having a plurality of pixels configured to detect electromagnetic radiation. The imaging device can further comprise a processing device configured to deactivate, based on an event count, a pixel of the SPAD array for a remaining duration of a first SPAD frame of the SPAD array, wherein the pixel remains deactivated for the remaining duration and the remaining duration spans from a deactivation time until an end of the first SPAD frame. The processing device can be further configured to reactivate the pixel in a subsequent SPAD frame of the SPAD array.

In some cases, the event count comprises an event count for the pixel during the first SPAD frame, and to deactivate the pixel comprises to deactivate the pixel in response to the event count for the pixel during the first SPAD frame reaching or exceeding a threshold count. In some cases, the event count for the pixel corresponds to a number of avalanche events counted by a counter. In some cases, the event count comprises an event count for the pixel, and the processing device is further configured to estimate an intensity for the pixel for the first SPAD frame based on a count rate for the pixel, the count rate based on the event count for the pixel and a time measure corresponding to the event count. In some cases, the first SPAD frame is divided into a plurality of time windows. The count rate for the pixel can comprise the event count for the pixel divided by the time measure for the event count. The event count for the pixel can comprise a number of events measured during the first SPAD frame. The time measure for the event count can comprise a number of the time windows for the event count. The estimated intensity for the pixel can comprise a product of the count rate and a total number of the plurality of time windows of the first SPAD frame.

In another example, one or more non-transitory machine-readable mediums storing instructions are provided. When executed by one or more processors, the instructions may cause an imaging process to be carried out to deactivate, based on an event count, a pixel of a single-photon avalanche diode (SPAD) array for a remaining duration of a first SPAD frame. The pixel can remain deactivated for the remaining duration and the remaining duration can span from a deactivation time until an end of the first SPAD frame. The instructions may further cause the imaging process to be carried out to reactivate the pixel in a subsequent SPAD frame. In some cases, the event count comprises an event count for the pixel during the first SPAD frame, and to deactivate the pixel comprises to deactivate the pixel in response to the event count for the pixel during the first SPAD frame reaching or exceeding a threshold count. In some cases, the event count comprises an event count for the pixel, and the instructions further comprise instructions to estimate an intensity for the pixel for the first SPAD frame based on a count rate for the pixel, the count rate based on the event count for the pixel and a time measure corresponding to the event count. In some cases, the count rate for the pixel comprises the event count for the pixel divided by the time measure for the event count. The estimated intensity for the pixel can comprise a product of the count rate and a full duration of the first SPAD frame.

DETAILED DESCRIPTION

Figure 1:
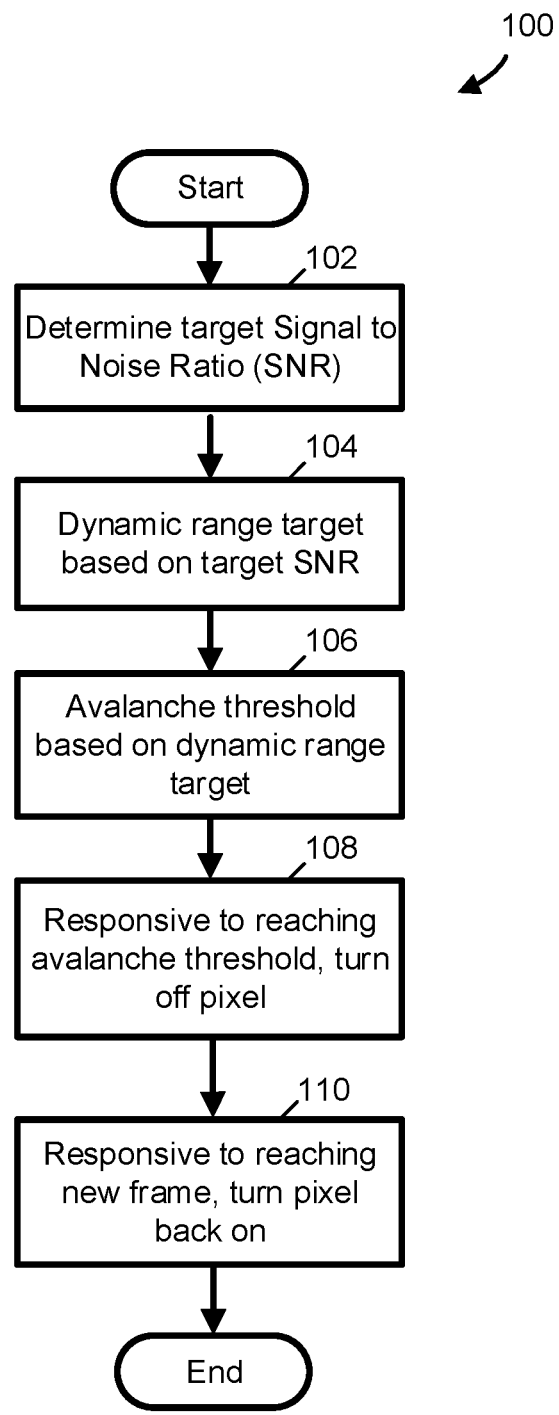
FIG. 1 is a flow diagram illustrating a method of providing a low-power single-photon avalanche diode (SPAD) image, in accordance with an example of the present disclosure.

Techniques are disclosed to provide a low-power single-photon avalanche diode (SPAD) image while maintaining a target dynamic range. The target dynamic range, in turn, can be based on a target signal-to-noise ratio (SNR) level or range. Accordingly, the techniques enable SPAD imaging to be used for two-dimensional (2D) night vision applications, while consuming significantly less (e.g., approximately 2 to 10 times less, or better) power than other night vision systems. Moreover, the techniques can maintain the target dynamic range without necessarily increasing power proportionally, thereby ensuring that the SPAD system can be sufficiently sensitive and have a sufficient SNR, for example for night vision applications.

In some examples, the techniques can be implemented in a system that comprises a SPAD array and a processing device. In various examples, the processing device may include one or more electronic circuits, circuit blocks, application specific integrated circuits (ASICs), microprocessors, digital signal processors (DSPs), graphics processing units (GPUs), microcontrollers, field programmable gate arrays (FPGAs), programmable logic arrays (PLAs), multi-core processors, general-purpose computers with associated memory encoded with instructions, or the like. The SPAD array can have a plurality of pixels configured to detect electromagnetic radiation.

Note that a SPAD pixel may potentially avalanche many times during a SPAD frame. In an embodiment of the present disclosure, if a desired dynamic range level for a given SPAD pixel is reached, the system can turn off that SPAD pixel for the remaining duration of the SPAD frame. As a result, the pixel can no longer avalanche within the same frame, thereby reducing power consumption.

In one such example, the processing device can be configured to deactivate a pixel of the SPAD array for a remaining duration of a first detection frame of the SPAD array. The remaining duration can span from a time at which the pixel is deactivated until an end of the first detection frame. The processing device can be further configured to reactivate the pixel in a subsequent detection frame of the SPAD array.

General Overview

As described above, non-trivial issues with night vision remain, particularly with respect to power consumption. SPAD technology may provide lower power consumption than complementary metal-oxide semiconductor (CMOS) image sensor (CIS) 2D night vision devices, which may consume a baseline level of power regardless of the light level measured. In addition, a SPAD may have a slightly lower median temporal noise compared with a CIS, and the SPAD's temporal noise can reduce rapidly with increasing frame rate and lower temperature. But there are challenges with respect to using SPAD for night vision applications. For example, it is preferable not to use active illumination for night vision applications. Moreover, the range of 3D depth sensing may be limited, even if active illumination is allowed. A 1D SPAD pixel array is suitable for relatively long ranges, for example approximately 100 meters or more. A 2D SPAD pixel array is suitable for intensity images at relatively short ranges, such as approximately 10 meters or less. Also, in some SPAD designs, the dynamic range may be low. For example, some SPAD designs may have a dynamic range equivalent to that of a CIS. Accordingly, an increase (e.g., double or more, such as 2-fold to 10-fold, or 10-fold to 100-fold) in dynamic range is desirable for 2D night vision applications.

Thus, and according to some embodiments, techniques are provided herein that can provide a relatively low-power SPAD image while providing sufficient sensitivity for 2D night vision applications, and while maintaining a target dynamic range, which, in turn, can be based on a target SNR level or range. The target dynamic range can be maintained without necessarily increasing power proportionally. In some examples, the system can distribute a timing signal to each pixel, thereby dividing a frame into a number of equally spaced time windows, such as 64 time windows, although any number of time windows can be used. When the count reaches a threshold value at a timing edge, e.g. an end of a time window, the system can record the time and/or an index of the time window, and can record the count. The threshold value may correspond to a target dynamic range. For example, the threshold value may correspond to a count between 128 and 256 during the frame. The system can then disable the pixel starting at the timing edge.

FIG. 1 is a flow diagram illustrating a method 100 of providing a low-power single-photon avalanche diode (SPAD) image, in accordance with an example of the present disclosure. In various examples, method 100 may be performed by an imaging device such as a SPAD array, and/or by a processor or circuit controlling the SPAD array and/or a respective SPAD pixel, such as described below with respect to FIGS. 3-5B.

As shown in FIG. 1, providing a low-power SPAD image can start with determining 102 a target signal-to-noise ratio (SNR). In some examples, the target SNR may be determined based on a user input, and/or may be fixed, for example as a specification or design parameter of the system. Alternatively, in some examples, the target SNR may be determined by the system. The target SNR may be, for example, a desired SNR threshold or range acceptable to a given application.

Next, providing a low-power SPAD image continues with determining 104 a target dynamic range. The target dynamic range may be determined based on the target SNR of operation 102. For example, dynamic range may be defined as a maximal SNR (expressed in decibels) corresponding to the most intense signal capable of being measured. Accordingly, the target dynamic range may be determined 104 as the target SNR (expressed in decibels). In some examples, the target dynamic range may be fixed, for example as a design parameter of the system. Alternatively, in some examples, the target dynamic range may be determined 104 by the system based on the target SNR.

Next, providing a low-power SPAD image continues with determining 106 an avalanche breakdown count threshold. The avalanche threshold may be determined based on the target dynamic range and/or SNR of operations 102 and 104. For example, the avalanche threshold may be equal to the target dynamic range. In particular, there can be a relationship between the event count of avalanche breakdown events measured by the imaging device and the estimated intensity measured by the respective pixel, as described below in the example of FIG. 5B. For example, the event count m may be related to the estimated intensity I by an extrapolated frame count, for example a count rate m/n multiplied by a number of time windows in the frame, I=mT/n, where n is the number of time windows to reach the count m and T is the total number of time windows in the frame.

Accordingly, such a relationship can be used to determine 106 the avalanche count threshold M that corresponds to the target dynamic range DR, which may correspond to the maximum value of I that can be measured by the respective SPAD pixel, $DR=I_{max}$. Note that dynamic range is defined as the logarithm of a ratio of the detector's (SPAD pixel's) maximum count rate to its root mean square (RMS) dark count rate (DCR). Thus, a detector's dynamic range is equivalent to the SNR when the measured intensity I reaches its maximum possible value $I_{max}$ on that detector (SPAD pixel). For example, the intensity I can be maximized if m reaches the threshold M within just a single time window, n=1. In this case, $DR=I_{max}=mT \leq M\,T$, so the threshold M can be set 106 based on the target dynamic range DR determined in operation 104, divided by the number of time windows T per frame: M=DR/T.

During operation, the count m for a respective pixel may reach the threshold M in fewer than the total number of time windows, i.e. m≥M may occur for n<T. If this occurs, the system can deactivate 108 the respective pixel for the remainder of the SPAD frame so as to reduce power, as disclosed herein below. In particular, in such a case, the target dynamic range has been reached, thereby attaining the target SNR, while the average count rate ⟨R⟩ ∝m/n for the frame can also be extrapolated reliably based on the m≥M measured counts. In some examples, the avalanche threshold M may be fixed, for example as a design parameter of the system. Alternatively, in some examples, the avalanche threshold range may be determined 106 by the system based on the target dynamic range.

Next, providing a low-power SPAD image continues with deactivating 108 the respective pixel for the remainder of the SPAD frame. By deactivating 108 the respective pixel for the remainder of the SPAD frame, the system can conserve power, thereby achieving low-power SPAD imaging, even while maintaining the target dynamic range. In particular, the power usage of the SPAD may be dominated by the avalanche breakdown events occurring in the respective pixels, whereas dormant pixels can consume a negligible amount of power while no avalanche breakdown events are occurring. In contrast, other night vision sensors, such as CIS 2D night vision devices, may consume a baseline or otherwise higher level of power regardless of the light level measured. Accordingly, by deactivating 108 the respective pixel, the system can reduce or virtually eliminate power consumption by the deactivated pixel for the remainder of the SPAD frame.

In some examples, the SPAD detector can have an approximately 10-fold reduction in power compared with a CIS, at similar low light sensitivity. For example, if a 1 megapixel SPAD array operates at 200 cycles per frame, and at 120 frames per second, this results in an operational rate of 24 kHz. In this example, the SPAD's avalanche breakdown may consume 40 mW of power per breakdown for each pixel. If the SPAD detector uses a ripple counter to count the avalanche events at 24 kHz for a 1 megapixel SPAD array, the ripple counter may consume less than 10 mW of power. Accordingly, in an example, the system may have a total power of 50 mW at 24 kHz, e.g. 200 cycles per frame and 120 frames per second for a 1 Megapixel array. By comparison, an example CIS may consume approximately 500 mW of total power, approximately 10 times the power consumption of the 50 mW for the SPAD detector in this example.

For example, a processor or circuit controlling the SPAD array can send a signal to the SPAD array and/or to the individual pixel. In another example, the processor or circuit may control the respective pixel directly, for example by disconnecting power to the pixel's avalanche detector. In yet another example, each respective pixel may have its own respective control circuit, which may deactivate the detector in response to the event count m being greater than or equal to the threshold. Deactivating 108 the respective pixel for the remainder of the SPAD frame is further described below with respect to the examples of FIGS. 2 and 5A.

Next, providing a low-power SPAD image continues with reactivating 110 the respective pixel in a subsequent SPAD frame. In some embodiments, the imaging device, and/or a respective pixel thereof, may measure brightness independently in each SPAD frame. Accordingly, in some examples, the duration of a respective SPAD frame can represent a temporal resolution of the SPAD image. Thus, although the system can conserve power by deactivating a respective pixel for the duration of the frame and extrapolating an average brightness over the frame (as in the example of FIG. 5B below), the system nevertheless can reactivate 110 the respective pixel at the beginning of a subsequent frame. In particular, in some examples, the system may repeat the method 100 to measure the respective pixel's brightness in the subsequent frame, without needing to retain a memory of the pixel's brightness history. In some examples, the method 100 may be iterated in each frame, and the entire array of SPAD pixels may be activated at the beginning of each iteration. Reactivating 110 the respective pixel in the subsequent SPAD frame is further described below with respect to the examples of FIGS. 2 and 5A.

The method 100 can then end.

Figure 2:
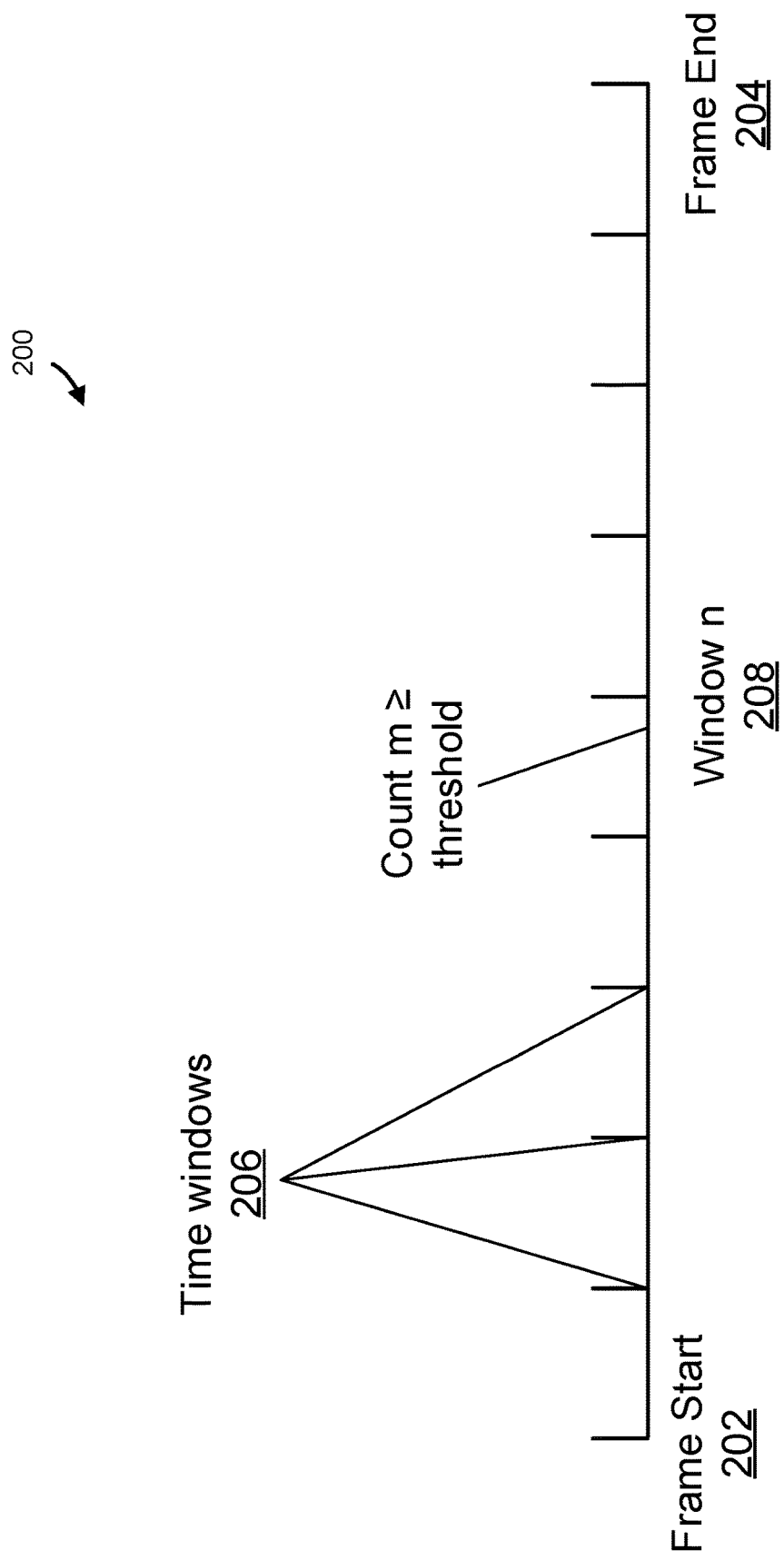
FIG. 2 illustrates a SPAD frame divided into multiple time windows, in accordance with an example of the present disclosure.

FIG. 2 illustrates a SPAD frame 200 divided into multiple time windows, in accordance with an example of the present disclosure. The SPAD frame 200 can correspond to a cycle during which a respective pixel of a SPAD can detect radiation via avalanche breakdown events. Each avalanche breakdown event can be counted by a counter, such as a ripple counter, or any other counter.

FIG. 2 shows a beginning 202 and end 204 of the SPAD frame 200. As shown, the frame 200 can be divided into a plurality of time windows 206, for example 64 time windows, 128 time windows, 256 time windows, or any other number of time windows. The time windows 206 may be evenly spaced between beginning 202 and end 204 of frame 200. For example, the system can send a timing signal to the respective pixel associated with the frame 200, thereby dividing frame 200 evenly into the time windows 206.

In this example, the count may reach a value m at the end of the nth time window 208. The value m may be greater than or equal to a predetermined threshold value, for example a threshold value determined based on the desired dynamic range, as described in the example of FIG. 1 above. Accordingly, the system may determine that m is greater than or equal to the threshold, for example a processor and/or circuit may compare the count m to the threshold, and thereby determine that m equals or exceeds the threshold. In some examples, each respective pixel may have its own respective circuit to compare the event count m to the threshold. In some cases, a different threshold value may potentially be used for each pixel. Alternatively or additionally, in some examples, a centralized processor may compare the event counts of all the pixels to the threshold value.

When the system determines that the count m equals or exceeds the threshold value at the end of the nth time window 208, it can instruct the SPAD array to deactivate the respective pixel, as disclosed herein. For example, the processor and/or circuit can send a signal to the SPAD array and/or to the individual pixel. In another example, the processor and/or circuit may control the respective pixel directly, for example by disconnecting power from the pixel's avalanche detector. In yet another example, each respective pixel may have its own respective circuit, which may deactivate the detector in response to the event count m being greater than or equal to the threshold.

In addition, the system may determine a measure of average intensity measured during the frame 200 for the respective pixel, as described in greater detail in the example of FIG. 5B below. For example, the measure of average intensity may be a dynamic range (DR). The system may determine the average intensity by extrapolating the average count rate for the first m counts to be constant over the entire frame 200. For example, the system can determine the average count rate as $\langle R \rangle \propto m/n$, and can then extrapolate the measure of average intensity over the frame 200 as DR=m T/n, where T is the total number of time windows 206 in frame 200. In some examples, the measure of average intensity may be determined by the processor and/or circuit.

After the end 204 of the frame 200, the system may reactivate all the pixels in the SPAD array, so that the light intensity can be measured in the subsequent frame independently of the value measured in frame 200. In some examples, even though a given pixel may be deactivated in the frame 200, the same pixel is not necessarily deactivated in the subsequent frame, until the count reaches the threshold. Conversely, a pixel that has not been deactivated in frame 200 may still be deactivated in the subsequent frame, once the pixel's count has reached or exceeded the threshold value.

System Architecture

Figure 3:
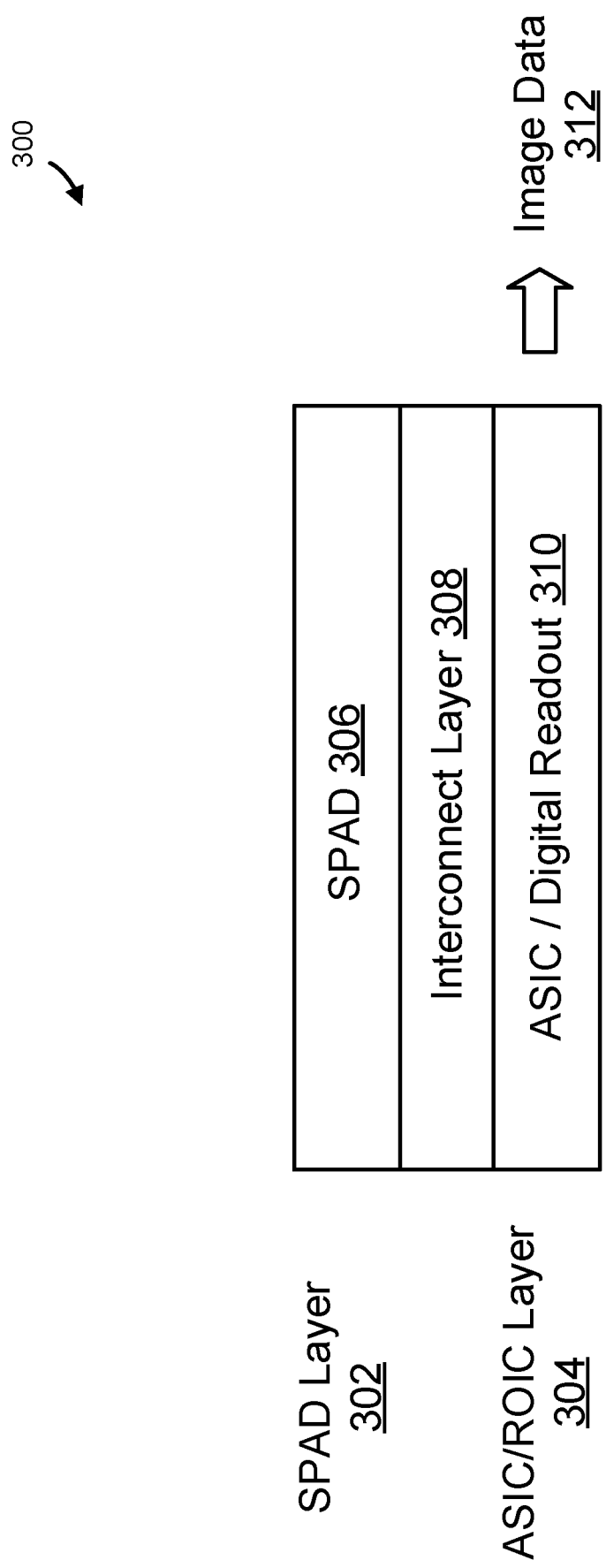
FIG. 3 is a block diagram illustrating details of a low-power SPAD system, in accordance with an example of the present disclosure.

FIG. 3 is a block diagram illustrating details of a low-power SPAD system 300, in accordance with an example of the present disclosure. In this example, system 300 includes a SPAD layer 302 and an application specific integrated circuit (ASIC)/readout integrated circuit (ROIC) layer 304. In some examples, SPAD layer 302 may correspond to an upper or top tier of silicon, while ASIC/ROIC layer 304 may correspond to a lower or bottom tier of silicon.

The SPAD layer 302 can contain SPAD 306. In an example, SPAD 306 may include a SPAD array, corresponding to a plurality of single-pixel SPAD cells. Each SPAD cell may be coupled to a respective counter, such as a ripple counter, to count the number of avalanche events of the respective SPAD cell.

The interconnect layer 308 may connect the SPAD layer 302 to the ASIC/ROIC layer 304, which contains an ASIC/digital readout 310. The ASIC/ROIC layer 304 and/or the ASIC/digital readout 310 may read output from the SPAD 306, for example by counting the avalanche events for each pixel of the SPAD array, which correspond to photon measurements. Accordingly, the ASIC/ROIC layer 304 and/or the ASIC/digital readout 310 can generate readout signals that correspond to radiation impinging on the SPAD array and determine a brightness value for each pixel of the SPAD array. Alternatively, the readout signal generated by the ASIC/ROIC layer 304 and/or the ASIC/digital readout 310 for a given pixel may be provided to an external processing circuit configured to count the avalanche events for that pixel. To this end, the degree of integration between readout circuitry and processing circuitry may vary from one example to the next.

In some examples, the low-power SPAD system 300 can receive image data 312 from one or more processor(s) and/or circuit(s), such as processor(s) and/or circuit(s) 410 of the example of FIG. 4 below. For example, pulses arriving at a counter, such as counter 402 of FIG. 4 below, can be counted to obtain the count value m. The pulses and/or the pulse count m can then be processed by the processor(s) and/or circuit(s) to obtain image data 312. For example, the processor(s) and/or circuit(s) may estimate the intensity as I=m T/n, where T is the total number of time windows in the frame, and n is the number of time windows to reach the event count m. The ASIC/digital readout 310 can, in turn, send the image data 312 to an output, such as a night vision goggle display, or another display.

Figure 4:
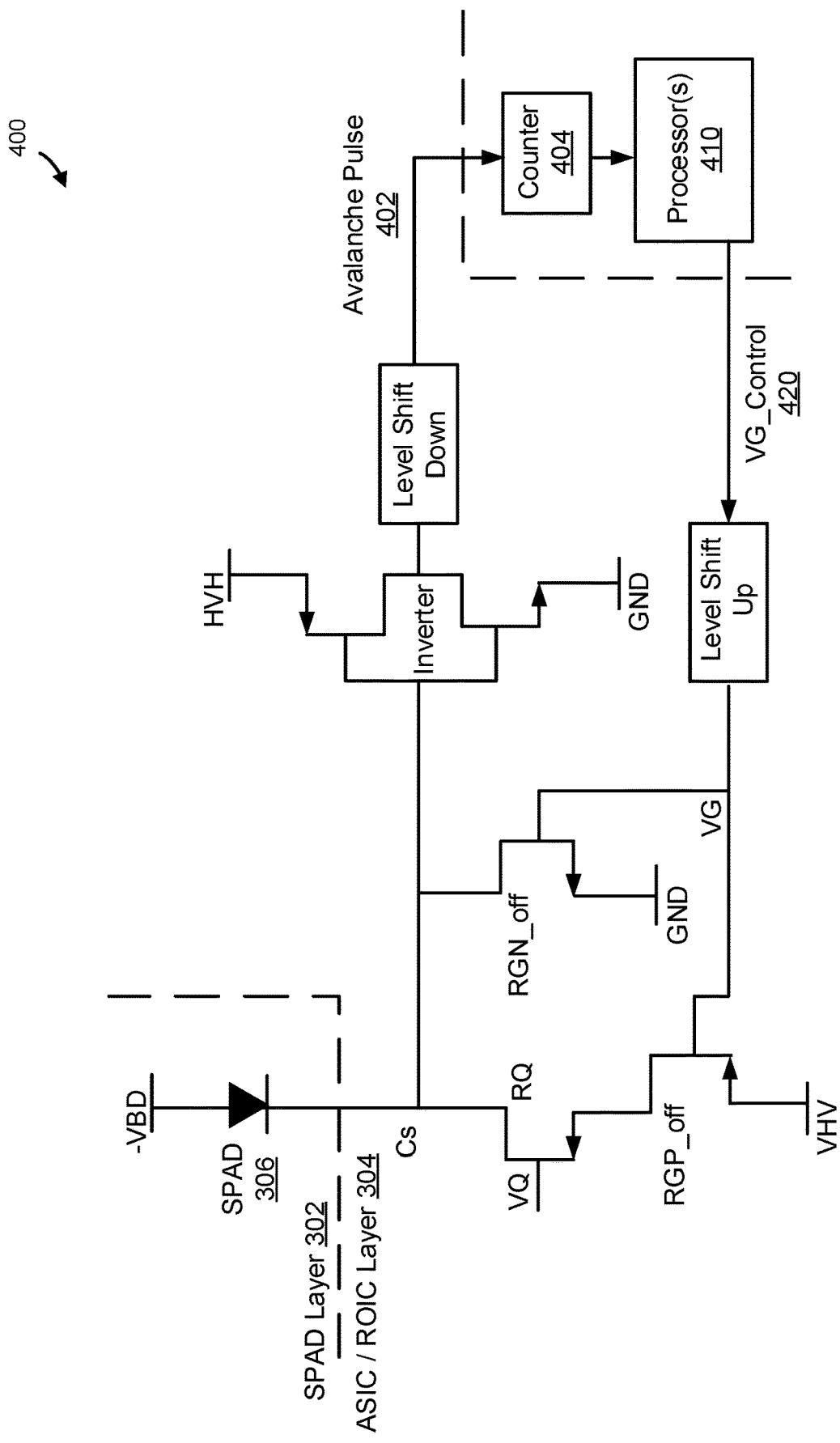
FIG. 4 is a circuit diagram illustrating further details of a low-power SPAD system, in accordance with an example of the present disclosure.

FIG. 4 below provides additional circuit details of the low-power SPAD system 300. For example, the ASIC/digital readout 310 may include the counter 402 and processors and/or circuits 410, as described below.

FIG. 4 is a circuit diagram illustrating further details of a low-power SPAD pixel 400, in accordance with an example of the present disclosure. In this example, the SPAD layer 302 includes the SPAD 306. The ASIC/ROIC layer 304 can contain other circuitry, such as an inverter, level shifts, a counter 404, and one or more processor(s) and/or circuit(s) 410. In particular, the avalanche pulse 402 can be received and counted in a power-efficient manner by the counter 404, which in some examples may include a standard ripple or asynchronous counter, although any other counter capable of counting such pulses can be used. In one example, a ripple counter including a cascaded arrangement of flip-flops is used, wherein the first flip-flop is clocked by pulse 402, and the subsequent flip-flops are clocked by the output of the preceding flip-flop. In this manner, the pulse 402 can ripple its way through the cascaded arrangement of flip-flops. The resolution of the counter can vary from one example to the next. In some examples, a 3-bit ripple counter or a 4-bit ripple counter can be used, which include three or four J-K flip-flops, respectively.

The SPAD pixel 400 can communicate with and/or be controlled by one or more processor(s) and/or circuit(s) 410, which can receive the count information from counter 404. In various examples, the processor(s) 410 may include one or more electronic circuits, circuit blocks, ASICs, microprocessors, DSPs, GPUs, microcontrollers, FPGAs, PLAs, multicore processors, general-purpose computers with associated memory, or the like. In some examples, the processor(s) and/or circuit(s) 410 may communicate with and/or control the SPAD pixel array (such as the SPAD array of the SPAD 306), which can include a plurality of pixels. Accordingly, in some examples, processor(s) and/or circuit(s) 410 may be centralized, and may be able to control any pixel and/or combination of pixels in the entire SPAD array. Alternatively or additionally, in some examples, each respective pixel may have its own respective circuit 410.

In response to the count information, the processor(s) and/or circuit(s) 410 can determine whether to deactivate and/or reactivate one or more SPAD pixels, for example by comparing a respective pixel's event count to the avalanche threshold, as disclosed herein. The processor(s) 410 can then send a signal VG_Control 420 to the circuit 400, which can deactivate and/or reactivate one or more SPAD pixels, as described in the examples of FIGS. 1, 2, and 5A-5B. In some examples, the signal VG_Control 420 is generated by counting and/or timing circuits of the processor(s) and/or circuit(s) 410.

For example, if VG_Control 420 corresponds to a high voltage, the SPAD can deactivate a respective pixel. Conversely, if VG_Control 420 corresponds to a low voltage, the SPAD can activate a respective pixel. In the case that VG_Control 420 corresponds to a low voltage and the respective pixel is activated, the power consumption of the SPAD pixel 400 may be proportional to the number of avalanche breakdown events triggered in the SPAD array by incoming photons. By contrast, when VG_Control 420 corresponds to a high voltage and the respective pixel is deactivated, incoming photons will not trigger avalanche events, and therefore the pixel's power consumption is negligible.

For example, in some specific embodiments, the counter 404 and processor(s) and/or circuit(s) 410 may be digital circuits implemented on a wafer using 65 nm or 40 nm semiconductor process node technology, and the digital circuit drain voltage Vdd may be approximately 1.2 V. Other transistors of SPAD circuit 400 for analog circuits may be implemented using 90 nm semiconductor process node technology, and the analog circuit collector voltage Vcc may be approximately 2.5 V to 3.0 V. The base-drain voltage Vbd for the reverse-biased SPAD diode may be approximately 15 V to 30 V. More generally, the circuitry of SPAD circuit 400 can be implemented using any suitable semiconductor process node technology or componentry, whether implemented in silicon or other suitable semiconductor material system, or on a printed circuit board (PCB).

In a first example, the SPAD 400 may make use of a counter 404 such as a plurality of 6-bit ripple counters that consume significantly less than 10 nW power. For example, the 6-bit ripple counters may be implemented with 45 nm semiconductor process node technology. The 6-bit ripple counters may count 64×128 times per second, and a respective ripple counter may occupy significantly less area than the 10 µm×10 µm area of a pixel. If each pixel in the SPAD array includes a 6-bit ripple counter, the SPAD system may distribute one clock signal at 64×128 Hz across all pixels. Conversely, when multiple pixels share one 6-bit ripple counter, the clock counter count times per second may be loosened.

In a second example, the SPAD 400 may use seven wires to perform clock distribution. In particular, the SPAD 400 may use one wire for frame rate control, and six wires for control of the 64 time windows within each frame.

Light detection via SPAD technology may be inherently fast. In particular, the detection of an incoming photon may be in the timing range of about 10 ns to 100 ns. Accordingly, the SPAD 400 may be capable of operating at a frame rate as high as 1200 fps or 12,000 fps, or higher. Note that a higher frame rate may be more useful at higher light levels, whereas a lower frame rate can improve SNR when the light level is close to the sensor's sensitivity limit. Therefore, in some embodiments, the system may employ relatively higher frame rates at higher light levels. Implementation of high frame rates may make use of the high-speed timing signal for high dynamic range. If the signal level (e.g., the dynamic range) per frame is maintained relatively constant, power consumption is expected to rise proportionally with the frame rate.

Moreover, SPAD detection may be inherently based on a global shutter design, which is beneficial for implementation of computer vision. The system may mitigate the high current that results from multiple SPAD cells breaking down at a high rate, for example, by providing a large capacitor between the power supply and chip. Moreover, in some examples, passive quenching (PQ) can be the base design for the system and methods. For PQ, time gating may or may not be needed. In various examples, different approaches may be utilized to implement time gating.

In a first example, the system may implement time gating by using Passive Quenching Active Reset (PQAR) with a global timing signal. In this case, the dynamic range may not be high. For example, the system may count once and disable the SPAD within a time window. Using the clock for implementing a number of time windows within each frame (e.g., 64 time windows per frame). For example, with 64 time windows per frame, the maximum count per frame may be 64. In another example, increasing the number of time window per frame may increase the maximum count per frame. A global timing signal may not be sufficiently fast. At most 200 Hz is allowed, for example for power consumption below 50 mW.

Alternatively, in a second example, the system may use PQAR using a locally generated time delay for time gating. In various examples of this case, power consumption may or may not be high compared to 10 mW. In this case, the SPAD may be disabled for a locally generated time delay after passive quenching of the SPAD's avalanche breakdown. A locally generated time delay may be faster and more tunable than the case with a global timing signal. In particular, the locally generated time delay may provide a balance between lower peak current and higher dynamic range. The time delay length may be limited by the high light level for the pixel to detect linearly. An approximately 10-fold to 20-fold reduction of the peak current may be achieved, while maintaining a dynamic range of 90 dB.

Timing jitter may not be an issue for the SPAD system and methods. In some examples, the SPAD design may be optimized for lower base-drain voltage while maintaining high triggering probability. This may involve optimizing for lower power consumption per avalanche breakdown, as well as lower field-assisted dark current and hot pixel rate. In some examples, the SPAD design may be optimized for lower parasitic capacitance at the sensing node. This may involve optimizing for lower power consumption per avalanche breakdown. In some examples, the SPAD design may be optimized for larger pixel size and thicker EPI thickness. This may involve optimizing for higher QE at NIR wavelength. In some examples, the SPAD design may be optimized with a pixel and circuit design to turn off hot pixels permanently. In some examples, the SPAD design may be optimized with a pixel and circuit design to turn off normal pixel when counting is not necessary. In some examples, the SPAD for 2D intensity image applications may be optimized differently from the case for 3D depth sensing.

The hot pixel rate may be high due to the high electric field of a SPAD. Accordingly, in some examples, the SPAD may be designed so as to mitigate hot pixels. For example, the SPAD may feature a reduced depletion width of the high field region, which can lead to a reduction of the hot pixel rate. The base-drain voltage $V_{bd}$ may also be reduced, which can reduce power consumption, and in some cases the triggering probability may also be reduced. In a second example, hot pixels may be disabled by biasing the corresponding SPAD below $V_{bd}$. In particular, avalanche breakdowns of hot pixels can consume power, and can also cause belaboring pixels to undergo breakdown due to optical crosstalk. In a third example, interpolation may be used for disabled hot pixels. This may be a particularly expedient solution in the case of a monochrome sensor.

Methodology

Figure 5A:
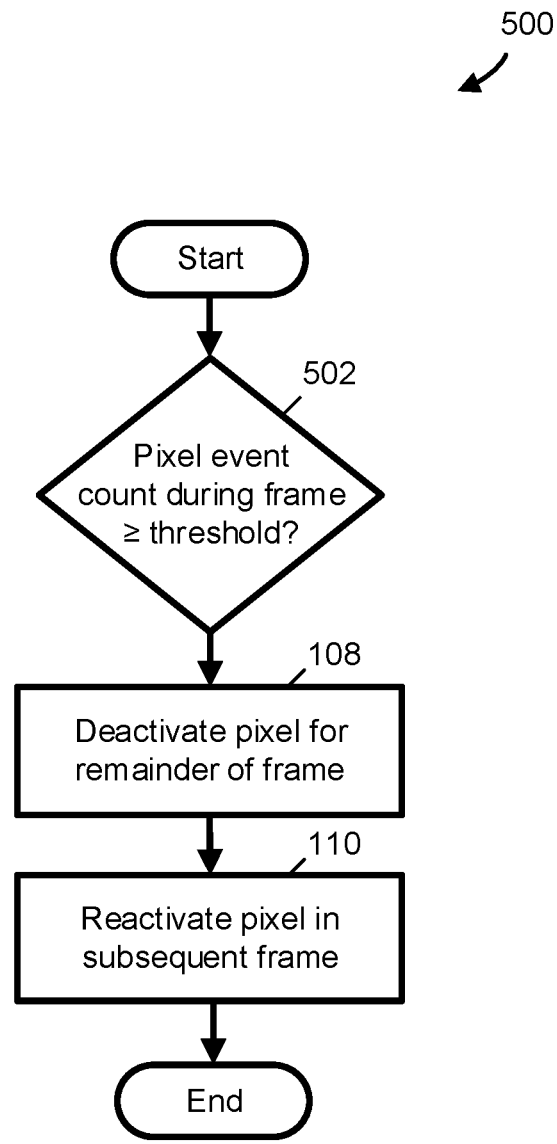
FIG. 5A is a flow diagram illustrating a method of providing a low-power SPAD image while maintaining a target dynamic range, in accordance with an example of the present disclosure.

FIG. 5A is a flow diagram illustrating a method 500 of providing a low-power SPAD image while maintaining a target dynamic range, in accordance with an example of the present disclosure. In various examples, method 500 may be performed by an imaging device such as a SPAD array, and/or by a processor or circuit controlling the SPAD array and/or a respective SPAD pixel.

As shown in FIG. 5A, providing a low-power SPAD image while maintaining a target dynamic range starts with determining 502 whether the frame avalanche breakdown event count m for a given pixel equals or exceeds a predetermined threshold. The threshold may be determined based on a target dynamic range and/or SNR, as described in the example of FIG. 1. The event count m may be a value reached at an end or edge of a respective time window, as described in the example of FIG. 2. In some examples, each respective pixel may have its own respective circuit to compare the event count m to the threshold. In some cases, a different threshold value may potentially be used for each pixel. Alternatively or additionally, in some examples, a centralized processor may compare the event counts of all the pixels to the threshold value.

Next, providing a low-power SPAD image while maintaining a target dynamic range continues with deactivating 108 the respective pixel for the remainder of the SPAD frame. For example, the processor and/or circuit can send a signal to the SPAD array and/or to the individual pixel. In another example, the processor and/or circuit may control the respective pixel directly, for example by disconnecting power from the pixel's avalanche detector. In yet another example, each respective pixel may have its own respective circuit, which may deactivate the detector in response to the event count m being greater than or equal to the threshold.

Next, providing a low-power SPAD image while maintaining a target dynamic range continues with reactivating 110 the respective pixel in a subsequent SPAD frame.

In some embodiments, the imaging device, and/or a respective pixel thereof, may measure brightness independently in each SPAD frame. Accordingly, in some examples, the duration of a respective SPAD frame can represent a temporal resolution of the SPAD image. Thus, although the system can conserve power by deactivating a respective pixel for the duration of the frame and extrapolating an average brightness over the frame (as in the example of FIG. 5B below), the system nevertheless can reactivate 110 the respective pixel at the beginning of a subsequent frame. In particular, in some examples, the system may repeat the methods 100, 500, and/or 550 to measure the respective pixel's brightness in the subsequent frame, without needing to retain a memory of the pixel's brightness history. In some examples, the methods 100, 500, and/or 550 may be iterated in each frame, and the entire array of SPAD pixels may be activated at the beginning of each iteration.

For example, the processor and/or circuit can send a signal to the SPAD array with instructions to reactivate the all pixels in the array, and/or send a signal to the individual pixel with instructions to reactivate the pixel. In another example, the processor and/or circuit may control one or more pixels of the array directly, for example by resuming power to the one or more pixels' respective avalanche detectors. In yet another example, each respective pixel may have its own respective circuit, which may reactivate the detector at the beginning of each frame.

The method 500 can then end.

Figure 5B:
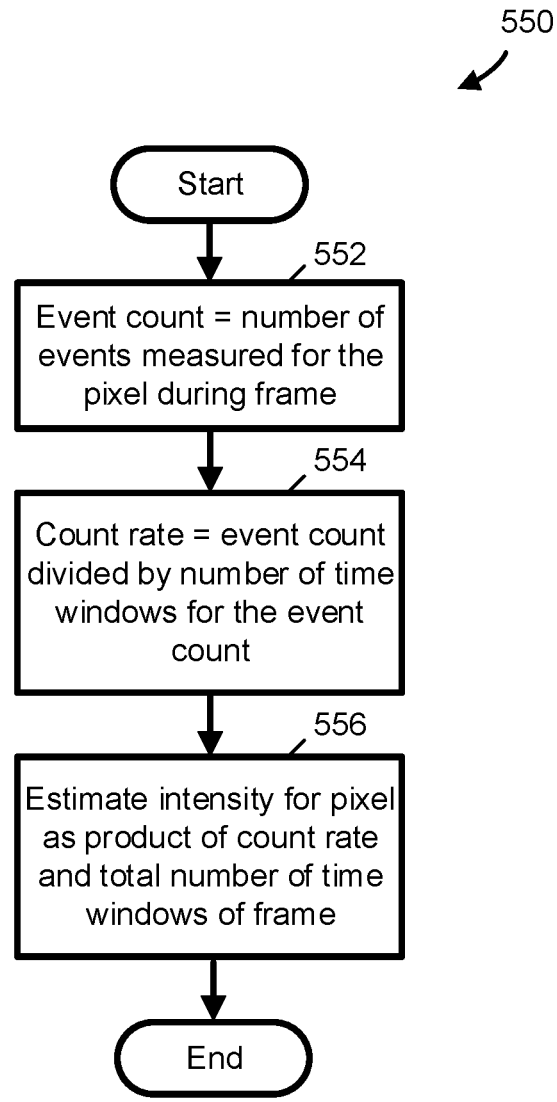
FIG. 5B is a flow diagram illustrating a method of estimating an average pixel intensity during a SPAD frame while providing a low-power SPAD image, in accordance with an example of the present disclosure.

FIG. 5B is a flow diagram illustrating a method of estimating an average pixel intensity over a SPAD frame while providing a low-power SPAD image, in accordance with an example of the present disclosure. In various examples, method 500 may be performed by an imaging device such as a SPAD array, and/or by a processor or circuit controlling the SPAD array and/or a respective SPAD pixel.

As shown in FIG. 5B, estimating an average pixel intensity over a SPAD frame while providing a low-power SPAD image starts with obtaining 552 an event count m, which can be equal to a number of events measured for a SPAD pixel within a given frame. For example, the event count may correspond to a time edge, such as the end of the nth time window of a plurality of time windows subdividing the frame, as in the example of FIG. 2 above. In some examples, the time edge may be the end of the time window in which the event count reaches or exceeds the predetermined event threshold M. Accordingly, in such examples, m≥M.

Next, estimating an average pixel intensity over a SPAD frame while providing a low-power SPAD image continues with determining 554 a count rate. In some examples, the system can determine 554 the count rate as the average count rate over the first n time windows of the frame, or the average count rate until reaching the threshold M. For example, the system can determine 554 the average count rate for the first n time windows, corresponding to the first m counts, as the event count m divided by the number n of time windows to reach the event count. For example, the system may determine 554 the average count rate as $\langle R \rangle \propto m/n$.

Next, estimating an average pixel intensity over a SPAD frame while providing a low-power SPAD image continues with estimating 556 an intensity I for the pixel as a product of the determined average count rate m/n and the total number T of time windows in the frame. Thus, the system may extrapolate the count over the entire frame based on the average count rate over the first n time windows. In an example, the system may estimate 556 the intensity over the frame as I=m T/n, where T is the total number of time windows in the frame.

In some examples, the dynamic range DR of the SPAD detector may correspond to the maximum value of the estimated intensity I that can be measured by the respective SPAD pixel, $DR=I_{max}$. Accordingly, the relationship I=m T/n may also relate the dynamic range DR to the event count m. In some examples, this relationship can be used when setting the avalanche count threshold M that corresponds to a target dynamic range DR, for example by setting M=DR/T, as described in the example of FIG. 1 above.

The method 550 can then end.

Computing Device

Figure 6:
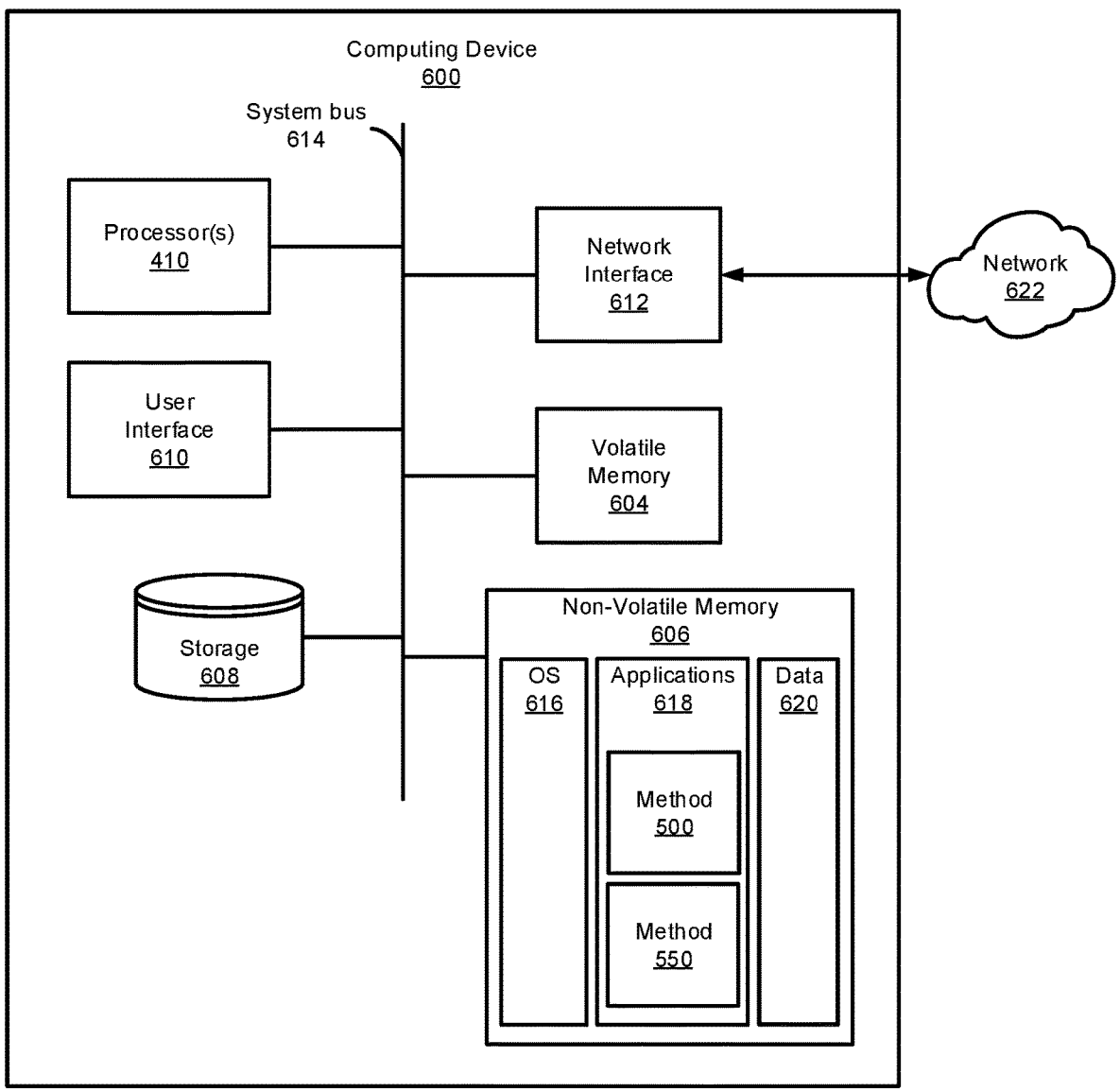
FIG. 6 is a block diagram of a computing device configured to implement various systems and processes in accordance with an example of the present disclosure.

FIG. 6 is a block diagram of a computing device 600 configured to implement various systems and processes in accordance with examples disclosed herein. The computing device 600 may also be referred to as a computer, a client device, an endpoint, a server, or a server computer system. Computing device 600 is illustrated as a non-limiting example of a client or server, and can be implemented within any computing or processing environment and with any number of physical or virtual machines that have suitable hardware and/or software.

In this example, the computing device 600 includes at least one processor 410, a volatile memory 604 such as random access memory (RAM) and/or a cache memory, a non-volatile (non-transitory) memory 606 and/or storage 608, a user interface (UI) 610, one or more network or communication interfaces 612, and a system bus 614 enabling the components of computing device 600 to communicate.

The non-volatile memory 606 can include read-only memory (ROM), programmable ROM, or flash drives. The storage 608 can include magnetic or optical storage media such as one or more hard disk drives (HDDs), solid state drives (SSDs) such as flash drives, hybrid magnetic and solid-state drives, and/or virtual storage volumes such as cloud storage. The storage 608 and/or non-volatile memory 606 may also include a combination of physical and virtual storage volumes.

User interface 610 may include a graphical user interface (GUI) (e.g., controls presented on a touchscreen, a display, etc.). Alternatively, the GUI may be part of the OS 616 and/or the applications 618. User interface 610 may also include one or more input/output (I/O) devices, such as a mouse, a keyboard, a microphone, audio speakers, cameras, accelerometers, visors, and the like. User interface 610 can also include output adapters and/or interface ports for the I/O devices. In some examples, the user interface 610 and/or the I/O devices can include an interface to the low-power SPAD system 300, as described in FIGS. 3-4 above. For example, the computing device 600 can receive the pulse count m from the low-power SPAD system 300, and/or can send the image data 312 to the low-power SPAD system 300, via the user interface 610 and/or the I/O devices, as described in FIGS. 3-4. Alternatively and/or additionally, in some examples the user interface 610 and/or the I/O devices can include the low-power SPAD system 300.

The non-volatile memory 606 and/or the storage 608 can store an OS 616, one or more applications or programs 618, and data 620. The OS 616 and the applications 618 include sequences of instructions encoded for execution by the processor(s) 410. Prior to their execution, the instructions can be copied to the volatile memory 604. In some examples, the applications 618 can include one or more applications to implement the method(s) 500 and/or 550, as described in FIGS. 5A-5B above. Data can be entered through user interface 610, or received from other I/O device(s), such as network interface 612.

The processor(s) 410 can execute instructions, such as computer programs, scripts, or codes, to perform the functions of computer system 600, including the functions described herein. The processor may include circuitry that performs a function, operation, or sequence of operations, which may be hard coded into the circuitry or soft coded by way of instructions held in a memory device and executed by the circuitry. For example, the processor(s) 410 may include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 410 can be analog, digital or mixed. In some examples, the processor(s) 410 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 612 can enable computing device 600 to access a computer network 622, such as a Local Area Network (LAN), a Wide Area Network (WAN), a Personal Area Network (PAN), or the Internet through a variety of wired and/or wireless connections, including cellular connections and Bluetooth connections. In some examples, the network 622 may allow for communication with other computing devices, to enable distributed computing. The network 622 can include, for example, one or more private and/or public networks over which computing devices can exchange data.

ADDITIONAL EXAMPLES

Example 1 is a method of providing a single-photon avalanche diode (SPAD) image. The method can comprise deactivating, based on an event count, a pixel of a SPAD array for a remaining duration of a first SPAD frame, wherein the pixel remains deactivated for the remaining duration and the remaining duration spans from a deactivation time until an end of the first SPAD frame. The method can further comprise reactivating the pixel in a subsequent SPAD frame.

Example 2 includes the method of Example 1, wherein the event count comprises an event count for the pixel, and deactivating the pixel is in response to the event count for the pixel reaching or exceeding a threshold count.

Example 3 includes the method of Example 2, wherein the event count for the pixel comprises an event count for the pixel during the first SPAD frame.

Example 4 includes the method of any one of the previous Examples, wherein the threshold count is based on a square of a predetermined signal-to-noise ratio.

Example 5 includes the method of any one of the previous Examples, wherein the event count for the pixel corresponds to a number of avalanche events counted by a counter.

Example 6 includes the method of any one of the previous Examples, wherein the event count comprises an event count for the pixel, and the method further comprises estimating an intensity for the pixel for the first SPAD frame based on a count rate for the pixel. The count rate can be based on the event count for the pixel and a time measure corresponding to the event count.

Example 7 includes the method of Example 6, wherein the count rate for the pixel comprises the event count for the pixel divided by the time measure corresponding to the event count. The estimated intensity for the pixel can comprise a product of the count rate and a full duration of the first SPAD frame.

Example 8 includes the method of Example 6 or 7, wherein the event count for the pixel comprises a number of events measured during the first SPAD frame. The first SPAD frame can be divided into a plurality of time windows. The time measure for the event count can comprise a number of the time windows for the event count. The full duration of the first SPAD frame can comprise a total number of the plurality of time windows of the first SPAD frame.

Example 9 includes the method of any one of Examples 6 through 8, wherein the estimated intensity for the pixel for the first SPAD frame corresponds to a dynamic range of the pixel for the first SPAD frame.

Example 10 includes the method of any one of the previous Examples, wherein the method further comprises deactivating a plurality of pixels of the SPAD array for respective remaining durations of the first SPAD frame. Reactivating the pixel in the subsequent SPAD frame can include reactivating the plurality of pixels at a start of the subsequent SPAD frame.

Example 11 includes the method of any one of the previous Examples, wherein the SPAD image comprises a 2-dimensional (2D) night vision image.

Example 12 is an imaging device. The imaging device can comprise a single-photon avalanche diode (SPAD) array having a plurality of pixels configured to detect electromagnetic radiation. The imaging device can further comprise a processing device configured to deactivate, based on an event count, a pixel of the SPAD array for a remaining duration of a first SPAD frame of the SPAD array, wherein the pixel remains deactivated for the remaining duration and the remaining duration spans from a deactivation time until an end of the first SPAD frame. The processing device can be further configured to reactivate the pixel in a subsequent SPAD frame of the SPAD array.

Example 13 includes the system of Example 12, wherein the event count comprises an event count for the pixel during the first SPAD frame, and to deactivate the pixel comprises to deactivate the pixel in response to the event count for the pixel during the first SPAD frame reaching or exceeding a threshold count.

Example 14 includes the system of Example 13, wherein the event count for the pixel corresponds to a number of avalanche events counted by a counter.

Example 15 includes the system of any one of Examples 12 through 14, wherein the event count comprises an event count for the pixel, and the processing device is further configured to estimate an intensity for the pixel for the first SPAD frame based on a count rate for the pixel, the count rate based on the event count for the pixel and a time measure corresponding to the event count.

Example 16 includes the system of Example 15, wherein the first SPAD frame is divided into a plurality of time windows. The count rate for the pixel can comprise the event count for the pixel divided by the time measure for the event count. The event count for the pixel can comprise a number of events measured during the first SPAD frame. The time measure for the event count can comprise a number of the time windows for the event count. The estimated intensity for the pixel can comprise a product of the count rate and a total number of the plurality of time windows of the first SPAD frame.

Example 17 is one or more non-transitory machine-readable mediums storing instructions. When executed by one or more processors, the instructions may cause an imaging process to be carried out to deactivate, based on an event count, a pixel of a single-photon avalanche diode (SPAD) array for a remaining duration of a first SPAD frame. The pixel can remain deactivated for the remaining duration, and the remaining duration can span from a deactivation time until an end of the first SPAD frame. The instructions may further cause the imaging process to be carried out to reactivate the pixel in a subsequent SPAD frame.

Example 18 includes the non-transitory machine-readable medium of Example 17, wherein the event count comprises an event count for the pixel during the first SPAD frame, and to deactivate the pixel comprises to deactivate the pixel in response to the event count for the pixel during the first SPAD frame reaching or exceeding a threshold count.

Example 19 includes the non-transitory machine-readable medium of Example 17 or 18, wherein the event count comprises an event count for the pixel, and the instructions further comprise instructions to estimate an intensity for the pixel for the first SPAD frame based on a count rate for the pixel, the count rate based on the event count for the pixel and a time measure corresponding to the event count.

Example 20 includes the non-transitory machine-readable medium of Example 19, wherein the count rate for the pixel comprises the event count for the pixel divided by the time measure for the event count. The estimated intensity for the pixel can comprise a product of the count rate and a full duration of the first SPAD frame.

The foregoing description of the embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method of providing a single-photon avalanche diode (SPAD) image, the method comprising:
   deactivating, based on an event count, a pixel of a SPAD array for a remaining duration of a first SPAD frame, wherein the pixel remains deactivated for the remaining duration and the remaining duration spans from a deactivation time until an end of the first SPAD frame; and
   reactivating the pixel in a subsequent SPAD frame;
   wherein the event count comprises an event count for the pixel, and deactivating the pixel is in response to the event count for the pixel reaching or exceeding a threshold count; and
   wherein the event count for the pixel corresponds to a number of avalanche events counted by a counter.

2. The method of claim 1, wherein the event count for the pixel comprises an event count for the pixel during the first SPAD frame.

3. The method of claim 1, wherein the threshold count is based on a square of a predetermined signal-to-noise ratio.

4. The method of claim 1, wherein the event count comprises an event count for the pixel, and further comprising estimating an intensity for the pixel for the first SPAD frame based on a count rate for the pixel, the count rate based on the event count for the pixel and a time measure corresponding to the event count.

5. The method of claim 4, wherein the count rate for the pixel comprises the event count for the pixel divided by the time measure corresponding to the event count, and the estimated intensity for the pixel comprises a product of the count rate and a full duration of the first SPAD frame.

6. The method of claim 5, wherein:
   the event count for the pixel comprises a number of events measured during the first SPAD frame;
   the first SPAD frame is divided into a plurality of time windows;
   the time measure for the event count comprises a number of the time windows for the event count; and
   the full duration of the first SPAD frame comprises a total number of the plurality of time windows of the first SPAD frame.

7. The method of claim 4, wherein the estimated intensity for the pixel for the first SPAD frame corresponds to a dynamic range of the pixel for the first SPAD frame.

8. The method of claim 1, further comprising:
   deactivating a plurality of pixels of the SPAD array for respective remaining durations of the first SPAD frame;

wherein reactivating the pixel in the subsequent SPAD frame includes reactivating the plurality of pixels at a start of the subsequent SPAD frame.

9. The method of claim 1, wherein the SPAD image comprises a 2-dimensional (2D) night vision image.

10. An imaging device, comprising:
a single-photon avalanche diode (SPAD) array having a plurality of pixels configured to detect electromagnetic radiation; and
a processing device configured to
deactivate, based on an event count, a pixel of the SPAD array for a remaining duration of a first SPAD frame of the SPAD array, wherein the pixel remains deactivated for the remaining duration and the remaining duration spans from a deactivation time until an end of the first SPAD frame, and
reactivate the pixel in a subsequent SPAD frame of the SPAD array;
wherein the event count comprises an event count for the pixel during the first SPAD frame, and to deactivate the pixel comprises to deactivate the pixel in response to the event count for the pixel during the first SPAD frame reaching or exceeding a threshold count; and
wherein the event count for the pixel corresponds to a number of avalanche events counted by a counter.

11. The imaging device of claim 10, wherein the event count comprises an event count for the pixel, and the processing device is further configured to estimate an intensity for the pixel for the first SPAD frame based on a count rate for the pixel, the count rate based on the event count for the pixel and a time measure corresponding to the event count.

12. The imaging device of claim 11, wherein:
the first SPAD frame is divided into a plurality of time windows;
the count rate for the pixel comprises the event count for the pixel divided by the time measure for the event count;
the event count for the pixel comprises a number of events measured during the first SPAD frame;
the time measure for the event count comprises a number of the time windows for the event count; and
the estimated intensity for the pixel comprises a product of the count rate and a total number of the plurality of time windows of the first SPAD frame.

13. One or more non-transitory machine-readable mediums storing instructions that when executed by one or more processors cause an imaging process to be carried out to:
deactivate, based on an event count, a pixel of a single-photon avalanche diode (SPAD) array for a remaining duration of a first SPAD frame, wherein the pixel remains deactivated for the remaining duration and the remaining duration spans from a deactivation time until an end of the first SPAD frame; and
reactivate the pixel in a subsequent SPAD frame;
wherein the event count comprises an event count for the pixel during the first SPAD frame, and to deactivate the pixel comprises to deactivate the pixel in response to the event count for the pixel during the first SPAD frame reaching or exceeding a threshold count; and
wherein the event count for the pixel corresponds to a number of avalanche events counted by the counter.

14. The one or more non-transitory machine-readable mediums of claim 13, wherein the instructions further comprise instructions to estimate an intensity for the pixel for the first SPAD frame based on a count rate for the pixel, the count rate based on the event count for the pixel and a time measure corresponding to the event count.

15. The one or more non-transitory machine-readable mediums of claim 14, wherein the count rate for the pixel comprises the event count for the pixel divided by the time measure for the event count, and the estimated intensity for the pixel comprises a product of the count rate and a full duration of the first SPAD frame.

* * * * *